US006592486B1

(12) United States Patent  
Arbanas et al.

(10) Patent No.: US 6,592,486 B1  
(45) Date of Patent: Jul. 15, 2003

(54) DRIVE UNIT FOR A VEHICLE WITH A CONTINUOUSLY VARIABLE TRANSMISSION

(75) Inventors: Viktor Arbanas, Baden (CH); Ernst Zysset, Macolin (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 10/048,929

(22) PCT Filed: Aug. 3, 2000

(86) PCT No.: PCT/EP00/07536

§ 371 (c)(1),  
(2), (4) Date: Feb. 5, 2002

(87) PCT Pub. No.: WO01/11262

PCT Pub. Date: Feb. 15, 2001

(30) Foreign Application Priority Data

Aug. 10, 1999 (EP) .............................................. 99115756

(51) Int. Cl.⁷ ................................................. F16H 3/72
(52) U.S. Cl. ............................. 475/84; 475/93; 475/107
(58) Field of Search ............................. 475/84, 92, 93, 475/104, 107; 180/372

(56) References Cited

U.S. PATENT DOCUMENTS 3,741,039 A * 6/1973 Garland ...................... 475/107
3,944,253 A * 3/1976 Ripley, III ................. 475/107
5,848,664 A * 12/1998 Kaspar ........................ 180/248
6,000,513 A * 12/1999 Richards ...................... 192/61

FOREIGN PATENT DOCUMENTS

| DE | 37 00 051 | * | 7/1988 |
| DE | 40 10 764 | * | 11/1991 |
| DE | 40 14 635 | * | 4/1993 |
| DE | 43 16 951 | * | 11/1994 |
| EP | 0 085 394 | * | 8/1983 |
| EP | 0 838 606 | * | 4/1998 |
| FR | 853542 | * | 3/1940 |
| FR | 2 666 130 | * | 2/1992 |
| WO | 89/00259 | * | 1/1989 |

* cited by examiner

Primary Examiner—Sherry Estremsky  
(74) Attorney, Agent, or Firm—Sughrue Mion, PLLC

(57) ABSTRACT

The drive assembly includes one or more motors (103, 104) driving at least a pair of continuously variable ratio transmission devices (101, 102) which each drive a driving wheel or driving axle of the vehicle. Each transmission device includes a planetary gear (3) whose reaction element, preferably the ring gear with an inner toothing, is connected to the rotor of a pump through which a hydraulic circuit passes provided with at least an adjustable valve (63) for adjusting the speed and/or the torque of the output shaft (27), in particular to facilitate the attainment of an operating speed for the motor when starting. The hydraulic circuits of the two transmission devices are interconnected by hydraulic lines (105, 107), which assures a differential effect between the two wheels concerned. One of these lines may include an adjustable valve (109) for limiting or blocking the differential effect.

16 Claims, 6 Drawing Sheets

DRIVE UNIT FOR A VEHICLE WITH A CONTINUOUSLY VARIABLE TRANSMISSION

The present invention concerns a vehicle drive assembly, including motor means and at least a continuously variable ratio transmission device which drives a driving wheel or a driving-axle of the vehicle, the transmission device including a planetary gear provided with an input shaft driven by the motor means and an output shaft coupled to the corresponding driving wheel or driving-axle, the planetary gear including three main elements, namely: a sun wheel, a planet wheel carrier provided with a plurality of planet wheels and a ring gear with an inner toothing meshed with the planet wheels, one of said three main elements being connected to the input shaft, another being connected to the output shaft and the third acting as a reaction element, the transmission device further including a positive displacement pump, driven by the reaction element of the planetary gear, and a hydraulic circuit passing through the pump and provided with at least an adjustable hydraulic valve.

The invention also concerns a continuously variable ratio transmission device, able to be used in such a drive assembly.

In a machine or vehicle driven by a motor, setting in motion the mass to be driven on starting imposes very unfavourable operating conditions on the motor for a few tens of seconds. This is true whether the motor is electric or an internal combustion engine. In other words, the torque available on starting is much lower than the nominal torque. Indeed, when there is a mechanical transmission between a motor and a element being driven, there is always a proportional relation between the respective speeds of the motor and the element being driven and the element being driven has to reach a certain rotational speed for the motor to be able to reach its nominal condition. Moreover, in the particular case of an electric motor, the current intensities are very high on starting, until the motor reaches a certain rotational speed. This causes heating and requires the use of complex current limiting devices.

Transmission devices of the type indicated hereinbefore allow these starting problems to be overcome, by appropriate control of the operating conditions of the pump driven by the planetary gear reaction element, this element preferably being the inner toothed ring gear. When the motor starts, it is possible to let the ring gear rotate initially without much torque. The speed of the output shaft driving the driving wheel can then remain at zero or very low for a short while. Since the motor encounters a low reaction torque it very quickly picks up speed. As soon as the motor rotates at a speed deemed sufficient to provide a high enough torque in good conditions, the reaction torque exerted by the ring gear is increased by braking or blocking the ring gear via the hydraulic circuit, which allows a strong enough motor torque to be transmitted through the planetary gear and the driving wheel to be started.

French Patent No. 853 542 discloses such a transmission device for motor vehicles and proposes using it as a gradual speed variator, transmitting the input power with variable and continuous output speeds between zero and a maximum speed. The inner toothed ring gear of the planetary gear further includes an outer toothing meshing on a loose additional pinion to form a gear pump. However, the drawbacks of this construction are that it is cumbersome and that the pressures in the pump produce a resulting radial force on the ring gear which is not zero, which means that the crown is prevented from being freely centred on the planet wheels. This may affect the working and lifetime of the planetary gear.

According to a variant suggested in German Patent Application No. 37 00 051, the ring gear forming the pump rotor may be provided with outer fins which slide radially and abut by sliding against an oval wall of the casing. However, such a pump would be fragile and would also require the ring gear to be very thick.

European Patent Application No. 838 606 discloses a transmission device of the type indicated in the preamble, wherein the ring gear of the planetary gear also constitutes the inner rotor of a "gerotor" or "gear rotor" type pump, this ring gear having outer teeth which mesh in the inner toothing of an eccentric rotating ring which surrounds it and which has one additional tooth. This construction has the drawback of being relatively expensive to manufacture, because of its double toothing. Moreover, it considerably increases the radial space requirement around the planetary gear.

According to the aforecited document, the continuously variable speed transmission device is inserted between the internal combustion engine and a vehicle driving-axle, the transmission output shaft being for example coupled to the driving-axle differential input pinion. In a variant, the vehicle includes to of these transmission devices, which are driven by the same motor and have a common output shaft which drives the driving-axle. The first device is used for driving forward, whereas the second does not transmit any torque, its pump rotating freely. Conversely, it is the second device which is used for driving in reverse, while the first rotates freely.

However, the authors of the present invention have found that the use of two or more transmission devices of the type described hereinbefore, for driving respectively two or more driving wheels of a vehicle, advantageously allows a hydraulic differential to be achieved between the wheels owing to an interconnection of the respective hydraulic circuits of the transmission devices.

More particularly, a first aspect of the invention concerns a vehicle drive assembly, including motor means, at least a pair of continuously variable ratio transmission devices which each drive a driving wheel or a driving-axle of the vehicle, and means for regulating the transmission devices, each transmission device including a planetary gear provided with an input shaft coupled to motor means and an output shaft coupled to the corresponding driving wheel or driving-axle, the planetary gear including three main elements, namely: a sun wheel, a planet wheel carrier provided with a plurality of planet wheels and a ring gear having an inner toothing meshed with the planet wheels, one of said three main elements being connected to the input shaft, another being connected to the output shaft and the third acting as a reaction element, each transmission device further including a positive displacement vacuum pump, driven by the reaction element of the planetary gear, and a hydraulic circuit passing through the pump and provided with at least an adjustable hydraulic valve, the regulating means being arranged to control said hydraulic valves to adjust the speed and/or the torque of the output shaft of each planetary gear, two points located on either side of the pump in the hydraulic circuit of each transmission device being connected to the corresponding points of the other transmission device by connecting hydraulic lines.

It will be noted that the transmission devices of such an assembly can be driven either by a common motor, which is preferable in the case of a heat engine, or by individual motors, for example electric motors in the case of an electric or hybrid-powered vehicle.

The invention also concerns a transmission device which can be used in such a drive assembly including a planetary gear provided with an input shaft coupled to motor means and an output shaft, a positive displacement pump incorporated in the planetary gear and associated with a hydraulic circuit provided with at least an adjustable hydraulic valve, and means for controlling said valve to adjust the speed and/or torque of the output shaft, the planetary gear being formed of a sun wheel, a carrier provided with a plurality of planet wheels and a ring gear having an inner toothing meshed with the planet wheels, the input shaft being connected to the sun wheel and the output shaft being connected to the planet wheel carrier or vice versa, the pump including a casing and a rotor formed at least in part by said ring gear, characterised in that the ring gear has a non-circular outer surface against which at least two segments, sliding radially in the pump casing, abut, said segments delimiting two symmetrical chambers from each other between the rotor and the pump casing.

The main advantages of this arrangement are that it reduces the space requirement, complexity and manufacturing cost of the pump, in particular owing to the simplicity of its rotor. The pump can thus occupy the same casing as the planetary gear without any significant increase in the size and complexity of the casing.

The invention will be better understood upon reading the following description of various embodiments of the invention, given by way of non limiting illustration with reference to the annexed drawings, in which.

Figure 1:
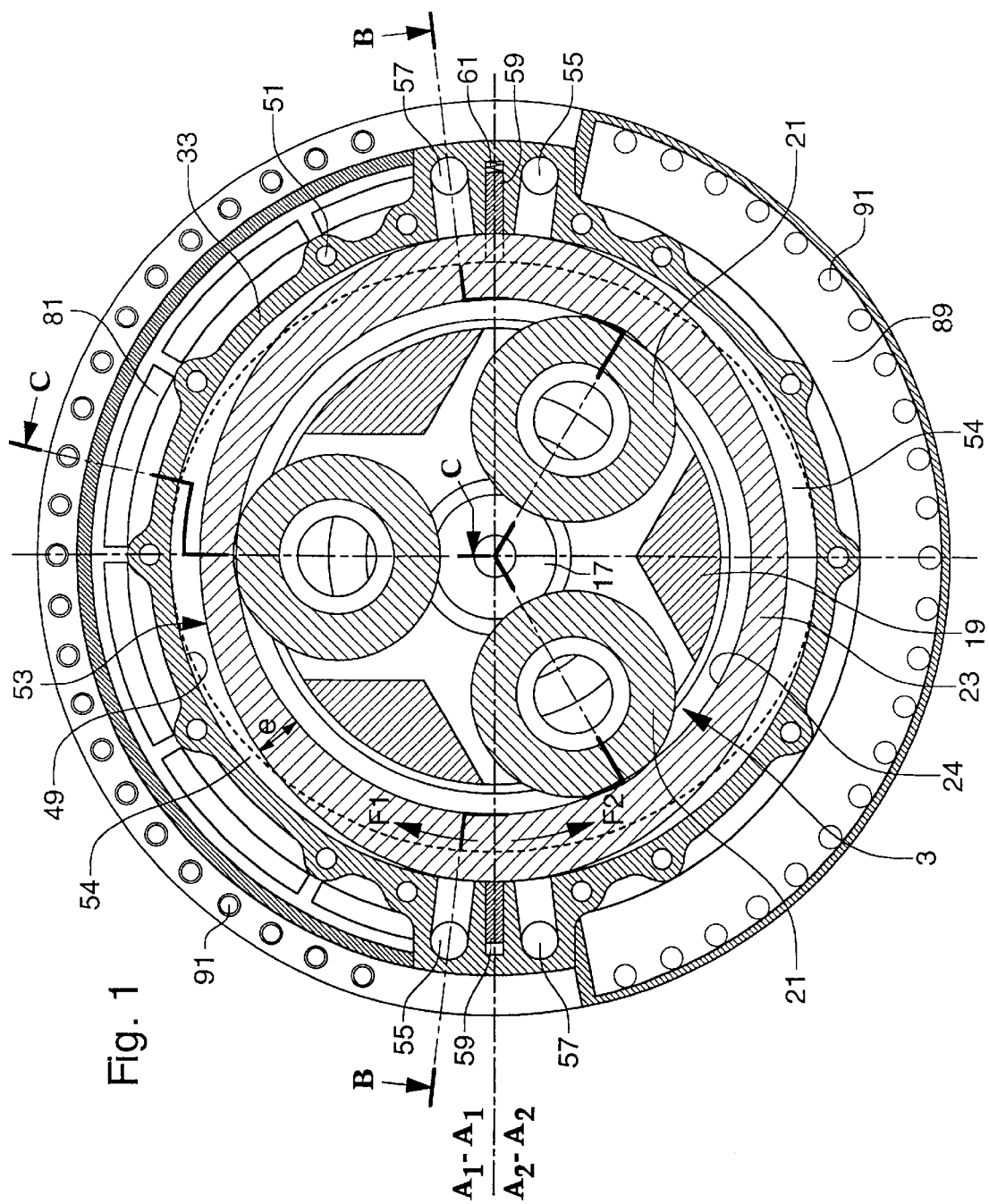
FIG. 1 is a radial cross-section of a drive unit which can be used in the present invention and is formed of an electric motor and a transmission device, this latter including a planetary gear and a hydraulic circuit passing into these two components, the Figure being formed of two half cross-sections along the line A1—A1 of FIG. 2 and line A2—A2 of FIG. 3.
Figure 2:
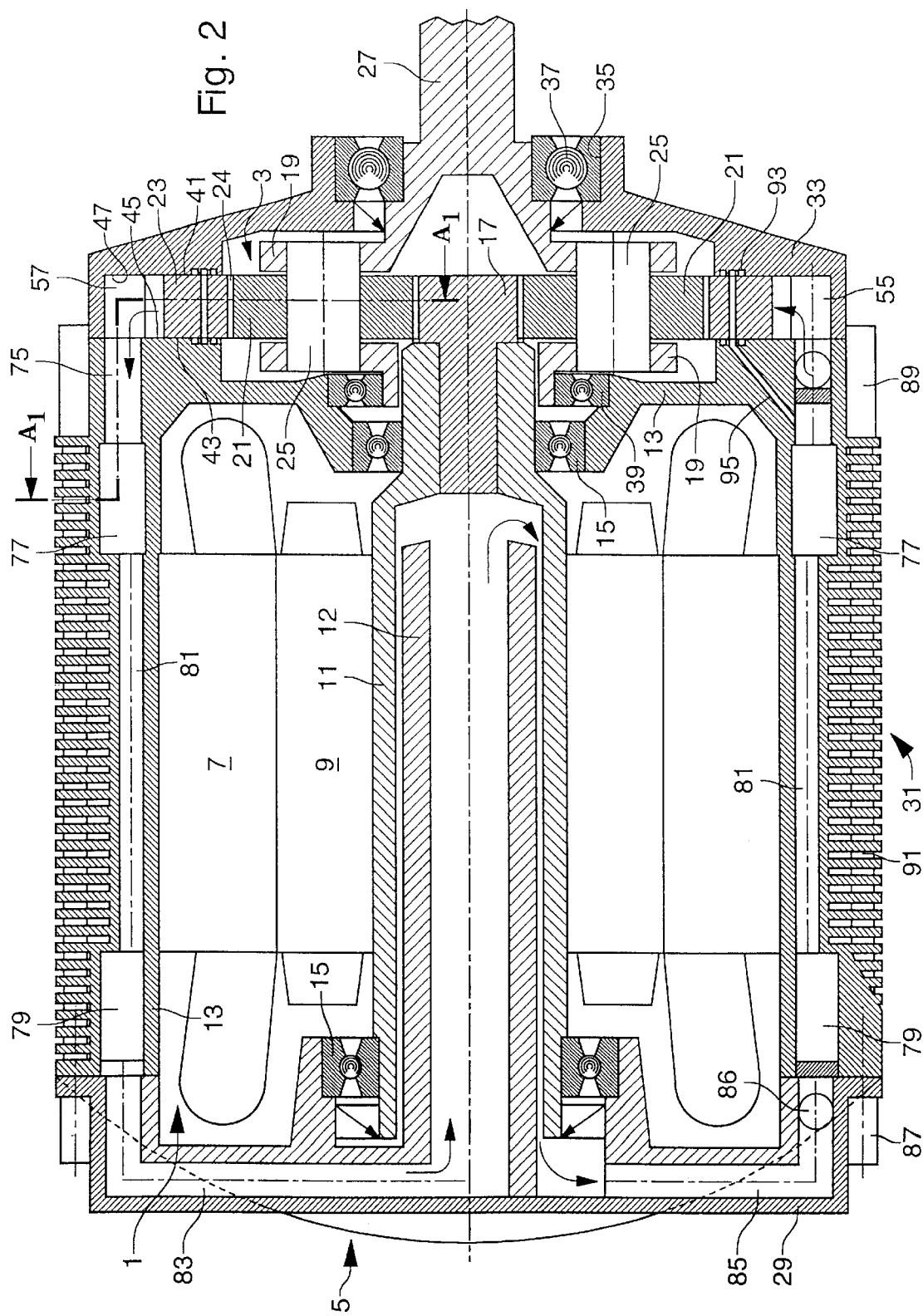
FIG. 2 is a longitudinal cross-section along the line B—B of FIG. 1.
Figure 3:
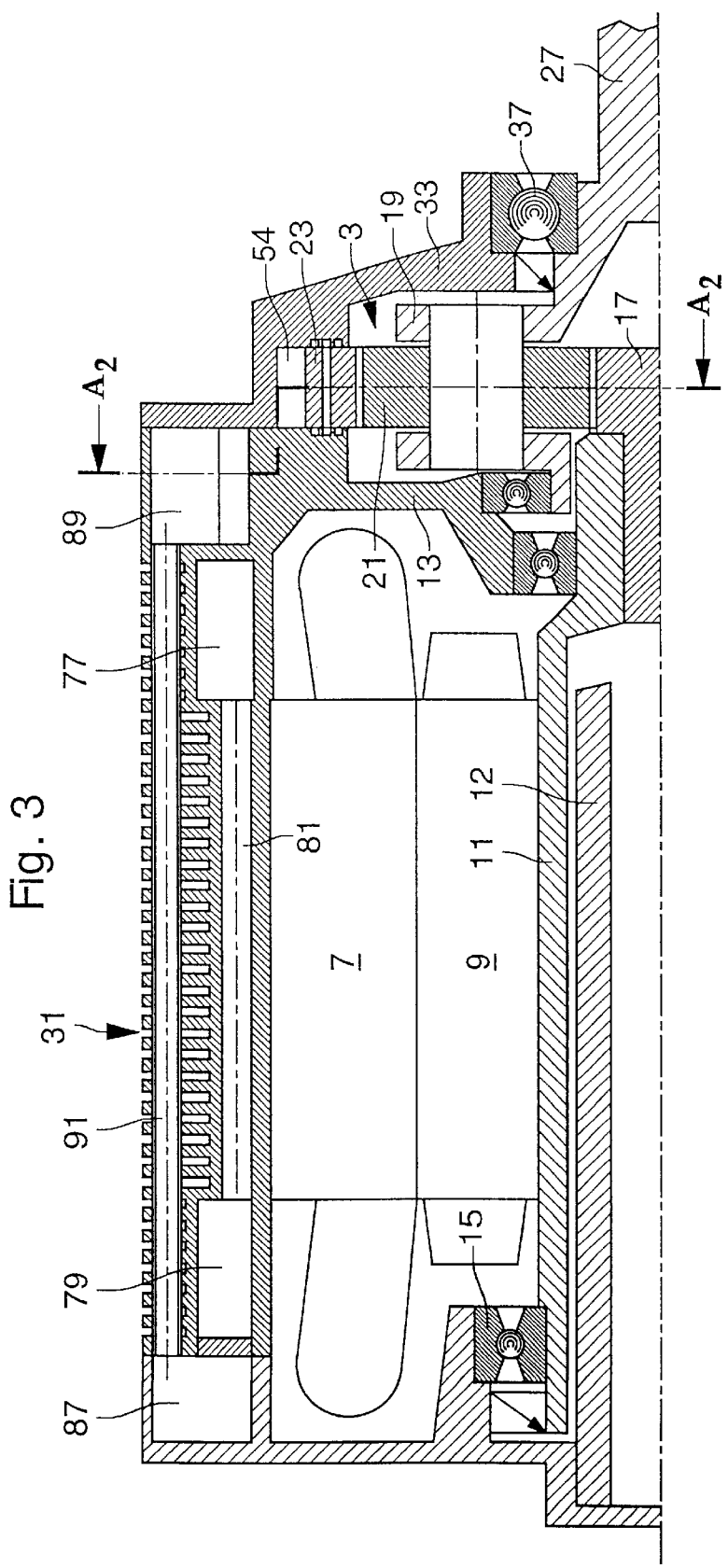
Figure 4:
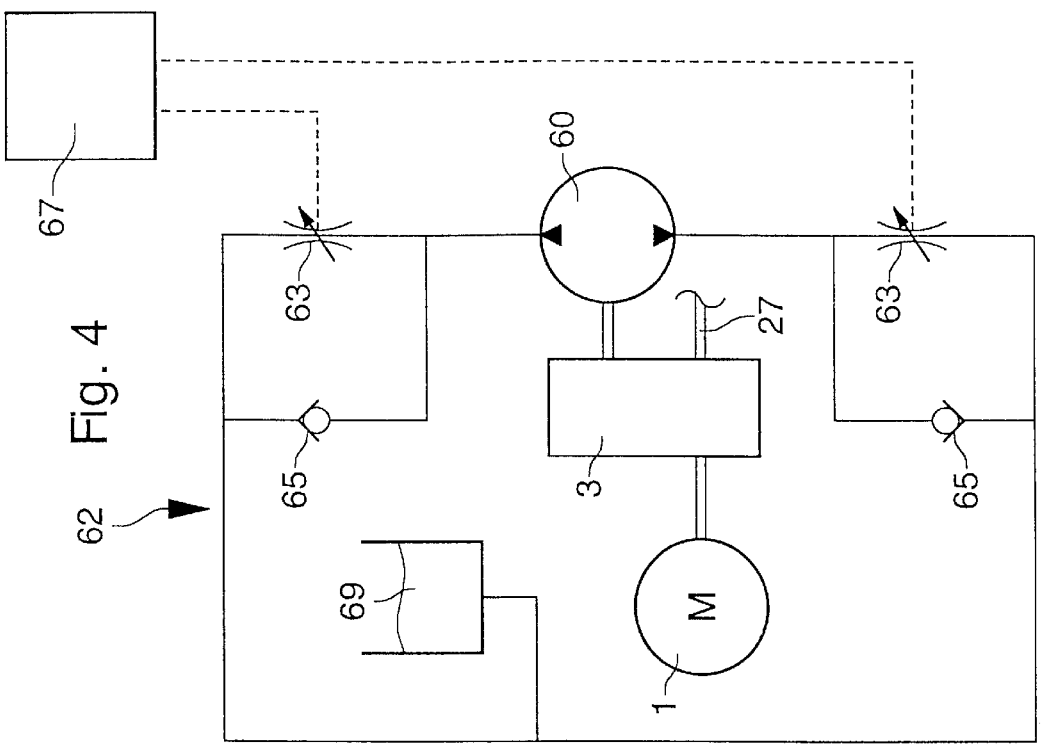
Figure 5:
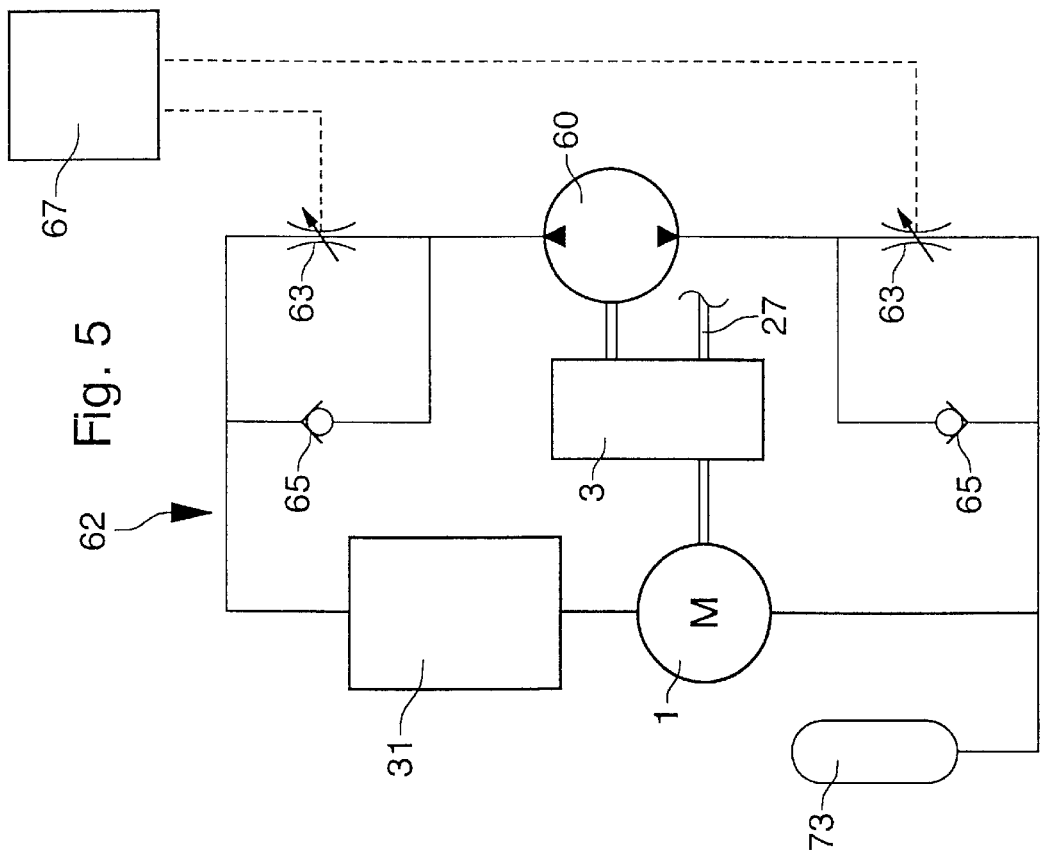
Figure 6:
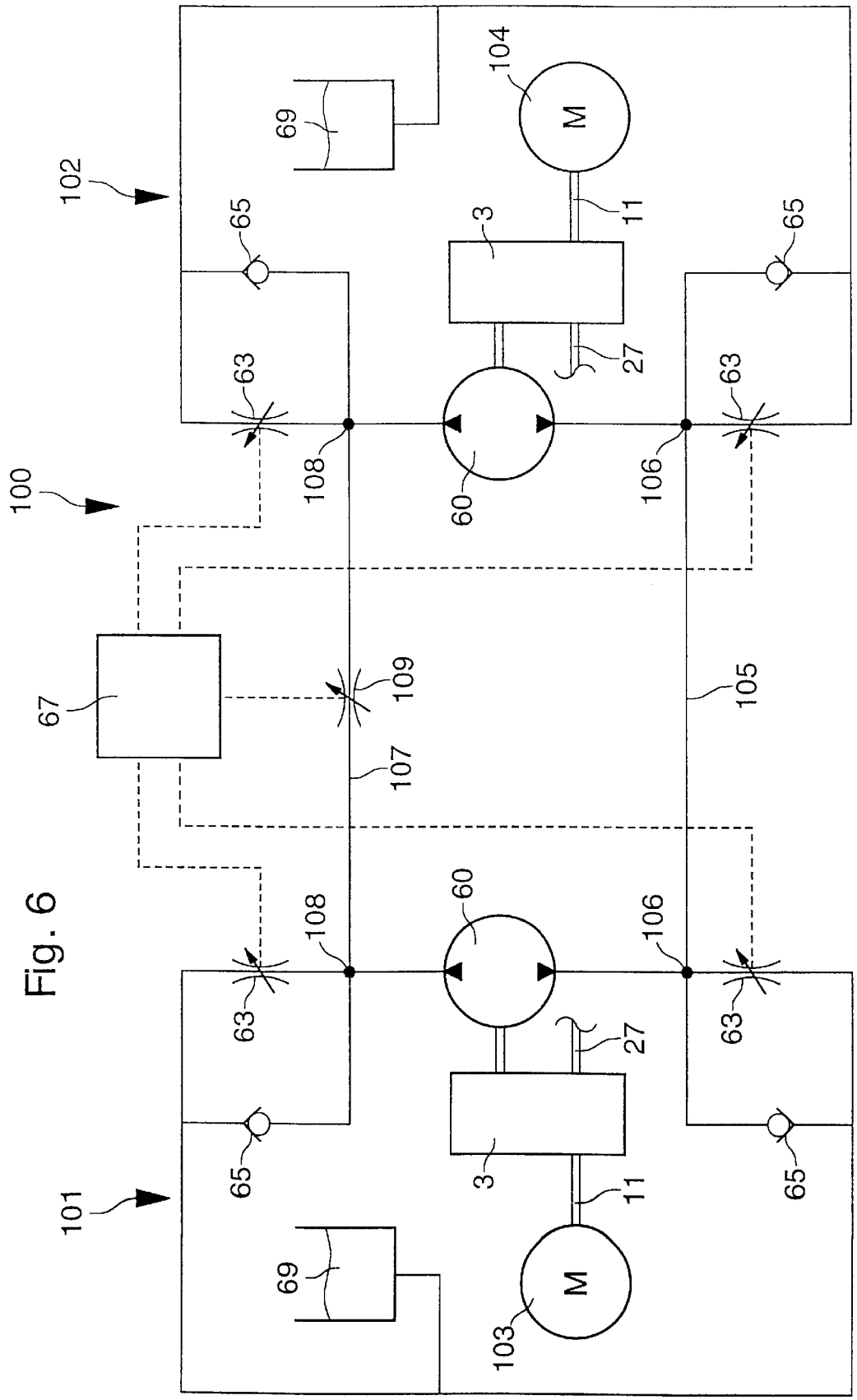
Figure 7:
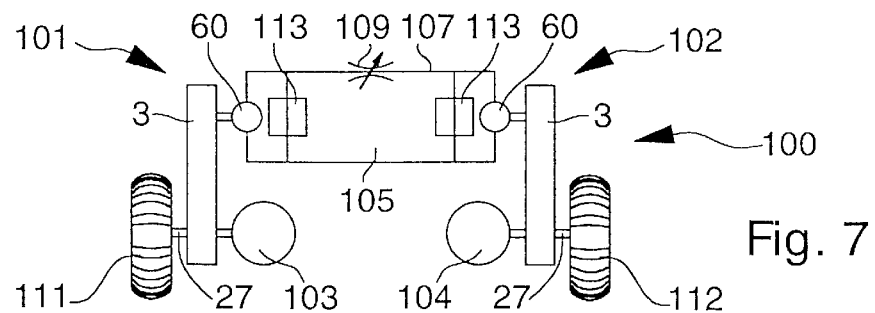
Figure 8:
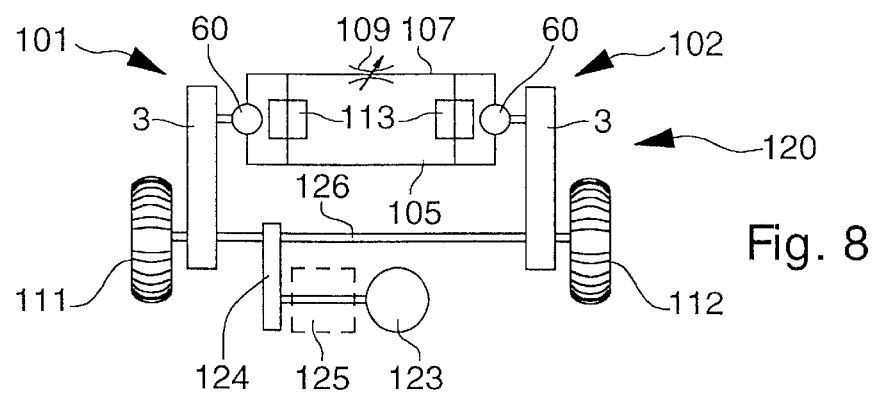
Figure 9:
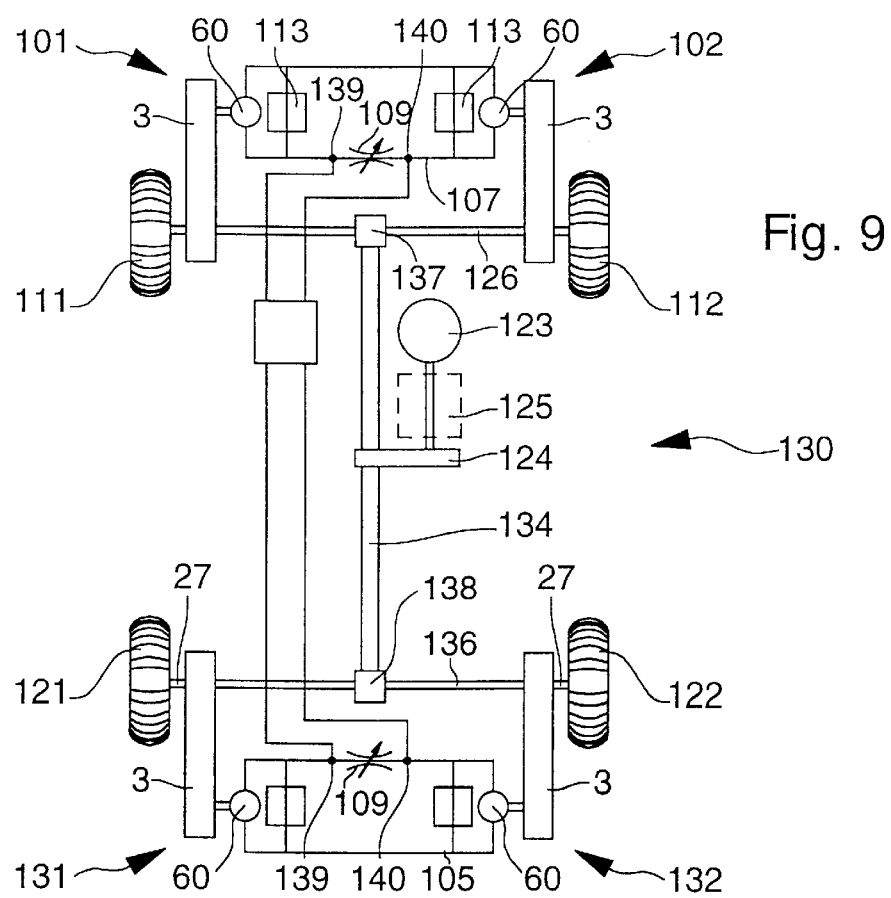

FIG. 3 is a longitudinal cross-section of half of the drive unit along the line C—C of FIG. 1, FIG. 4 is a diagram of a particular embodiment of the hydraulic circuit shown in FIGS. 1 to 3, FIG. 5 is a diagram of another embodiment of the hydraulic circuit, FIG. 6 shows schematically a first embodiment of a drive assembly according to the invention, including two units according to FIGS. 1 to 3, whose hydraulic circuits are interconnected, FIG. 7 is a simplified diagram of the drive assembly of FIG. 6, FIG. 8 is a similar diagram to FIG. 7, showing another embodiment of a drive assembly according to the invention, and FIG. 9 is a similar diagram to FIG. 7, showing yet another embodiment of a drive assembly according to the invention.

The driving unit shown in FIGS. 1 to 3 includes a motor 1 and a planetary gear 3 in a common casing 5 in two parts. The motor described here is an electric motor, but the invention could also be applied to an internal combustion engine. In a conventional manner, electric motor 1 includes a stator 7 and a rotor 9 provided with a hollow shaft 11. The shaft rotates about a central stationary tube 12. The assembly of these elements is housed in a motor frame 13 on which rotor shaft 11 rests via bearings 15. In the following description this shaft 11 is called the "input shaft".

Also in a conventional manner, planetary gear 3 is formed of a central sun wheel 17, a planet wheel carrier 19 provided with several planet wheels 21 (three as is seen more clearly in FIG. 1) and a ring gear 23 (i.e. an exterior planetary wheel) provided with teeth on its inner surface 24. The planet wheels 21 are mounted on planet wheel carrier 19 via shafts 25 and mesh simultaneously with sun wheel 17 and the toothing of ring gear 23. Planet wheel carrier 19 is extended by a shaft 27 called the "output shaft", intended to rotate a driven element (not shown in the Figures) and which can be an element of a machine or a vehicle wheel, for example.

Electric motor 1, its frame 13 and planetary gear 3 are mounted in cylindrical casing 5, which is made in several parts to allow the different elements to be assembled. More precisely, this casing 5 is formed of a circular bottom 29 which appears on the left of FIG. 2, an annular central portion 31 provided with fins and forming a radiator and a portion 33 opposite bottom 29, which protects more particularly planetary gear 3 and is called hereinafter the transmission casing 33. This transmission casing 33 has a generally conical shape and its portion of smaller diameter defines an opening 35 for the passage of output shaft 27. The end of planet wheel carrier 19 which is connected to output shaft 27 rests on a bearing 37 housed in this opening 35. Moreover, the other end of the planet wheel carrier rests on another bearing 39 which itself rests on frame 13 of the electric motor.

As illustrated in FIG. 2, in addition to its inner toothed face, ring gear 23 has two opposite plane lateral faces, called respectively front lateral face 41 (i.e. the face visible in FIG. 1) and back lateral face 43. Further, in the region located opposite said back lateral face 43, electric motor frame 13 has an annular plane contact surface 45. In a symmetrical manner, in the region located opposite front lateral face 41 of the ring gear, transmission casing 33 has an annular plane contact surface 47. These two contact surfaces 45, 47 contribute to guiding ring gear 23 and are separated from each other by a distance which allows said ring gear to rotate, but guaranteeing good sealing therewith.

With reference now to FIG. 1, it can be seen that transmission casing 33 has a cylindrical inner surface 49 and an outer wall provided with several orifices 51 intended to accommodate screws securing it to motor frame 13. Ring gear 23 has a smooth outer surface 53, opposite to its toothed inner surface 24. While the profile of inner surface 24 is circular, the profile of outer surface 53 is not circular, in this case oval. In other words, the radial thickness e of ring gear 23 is not constant. As a result there are two symmetrical and diametrically opposite chambers 54 between surfaces 49 and 53. These chambers are delimited laterally by aforementioned contact surfaces 45, 47. In a circumferential direction, they are delimited by two stationary segments 59 which slide radially into casing 33 and are pressed against surface 53 of the rotor by springs 61. By sliding against these segments, non circular surface 53 causes the volume of chambers 54 to vary. Thus, ring gear 23 and planetary gear casing 33 form a positive displacement pump 60 (FIGS. 4 to 6), ring gear 23 forming the rotor of said pump. According to a variant which is not shown here, ring gear 23 can constitute only part of the rotor, in the sense that two crescent shaped parts can be fitted onto a conventional ring gear (i.e. a circular ring gear), available on the market, to obtain the final oval or similar shape.

The pump can rotate in both directions, depending on the reaction torque direction. The two chambers 54 are connected respectively to suction and discharge orifices 55 and 57. In FIG. 1, ring gear 23 is supposed to rotate in the direction of arrow F1 and the section and discharge orifices are as shown. If however, the motor rotates in the other direction (the vehicle reverses), the reaction torque causes ring gear 23 to rotate in the opposite direction (arrow F2), suction orifices 55 then become discharge orifices 57 and vice versa, the coolant being pumped in the other direction.

Finally, it will be noted that ring gear 23 constituting the pump rotor does not need to be centred precisely in the planetary gear casing, since segments 59 pressed against it by springs 61 allow it to have a radial play with respect to surface 49 of casing 33.

The structure of the regulating circuit for hydraulic pump mentioned above is described with reference to the diagram of FIG. 4, which shows electric motor 1, planetary gear 3 and hydraulic pump 60, as well as hydraulic liquid circuit 62. In this case, the liquid is preferably oil. The circuit begins at the discharge orifices of pump 60 and forms a closed loop to return to the section orifices of the pump. This circuit is symmetrical and includes a pair of adjustable hydraulic valves. In the example shown, they are adjustable flow limit valves 63, but they could also be adjustable pressure limit valves. Each of these valves 63 is located downstream of each discharge orifice of the pump a branch pipe parallel to each valve 63 comprises an anti-backflow valve 65. This circuit is symmetrical so as to allow the pump to rotate in both directions. Adjustable valves 63 are automatically controlled by an electronic control unit 67 which can receive signals from sensors indicating for example the rotational speeds of input and output shaft 11 and 27, the position of the vehicle's accelerator, the temperature of motor 1, etc. The electronic unit may contain a programme which automatically controls starting and other operating phases of the drive device. Finally, the hydraulic circuit is connected to a tank 69 allowing liquid to be added to compensate for any variations in liquid quantity.

The working of the drive unit will now be explained in more detail.

When electric motor 1 is starting, electronic control unit 67 opens valves 63 to allows a certain flow of the liquid present in chambers 54 to pass. This has the effect of greatly reducing the reaction torque which ring gear 23 could exert on planet wheels 21, which also reduces the torques on input and output shafts 11 and 27. The speed of output shaft 27 may thus remain at zero or very low for a short moment, while electric motor 1 rapidly picks up speed since it encounters quite a low resistant torque. As soon as the motor rotates at a rate deemed sufficient to supply a high enough torque in good conditions, electronic control unit 67 closes at least partially valves 63 in order to increase the reaction torque of ring gear 23. This allows a strong enough torque to be transmitted to output shaft 27 in order to start the element to be driven. Once the vehicle or the machine to be driven has started, the pump rotor (ring gear 23) can be blocked by closing valves 63 so that all the power passes from the input shaft to the output shaft or vice versa.

It will be noted that if the sealing between lateral surfaces 41 and 43 of ring gear 23 and contact surfaces 45 and 47 is not perfect, this is of no great importance, since in such case the oil lubricates the planetary gear.

The drive unit can also operate in reverse, and in engine brake mode.

Another embodiment will now be described, in which the hydraulic liquid is used as coolant for electric motor 1. In this case shown schematically in FIG. 5 and corresponding to the construction illustrated by FIGS. 1 and 3, the pumped liquid also acts as cooling fluid and is thus preferably formed by water. After coming out of pump 60 and valve 63, the hydraulic circuit passes through the radiator 31 described hereinbefore and electric motor 1 before returning to the pump passing through anti-backflow valve 65. Instead of tank 69 described in the previous case, it is possible to provide a hydraulic accumulator 73. It will be noted that in this case, the hydraulic valve is advantageously an adjustable flow limiting valve.

The coolant circuit through the motor will now be described in more detail with reference to FIGS. 1 to 3.

As illustrated in the cross-section of FIG. 2, when the coolant originating from discharge orifice 57 has passed through valve 63 shown in FIG. 5, it penetrates, via a conduit 75, in a first annular channel 77 which extends over the entire periphery of the motor, then the coolant passes through a group of cooling conduits 81 of the stator to join a second annular channel 79 similar to channel 77, at the other end of the motor. As illustrated in FIG. 1, cooling conduits 81 are arranged substantially over the entire circumference of the stator. They can have a cross-section of any shape. Then, the coolant leaves second annular channel 79 and penetrates, via a radial conduit 83, central tube 12, where it comes out to pass between tube 12 and the inner surface of the hollow motor shaft, where it takes heat from the rotor. The coolant then passes into another radial conduit 85 and penetrates, via an orifice 86, radiator 31. The radiator includes a collector channel 87 connected to another collector channel 89 via a group of cooling tubes 91 passing through the fins of radiator 31 over the whole of its length. Finally, the coolant leaves collector channel 89 to join suction orifice 55. The two channels 87 and 89 each extend over a little less than half the circumference of the motor, as can be seen in FIG. 1, where it can also be seen that tubes 91 of radiator 31 have a circular cross-section.

It should be noted that radiator 31 could be designed differently in accordance with requirements, for example it could be arranged on one side of the motor only in order to be well exposed to a current of air. This current of air could be generated by a cooling fan and guided by a sheet metal cover covering the radiator.

In FIG. 2 it can be observed that contact surfaces 47, 45 respectively of motor frame 13 and of transmission casing 33 are provided with grooves 93. Moreover, motor frame 13 has a bore 95 connecting grooves 93 to the entry of annular channel 77. Since the coolant is preferably water, grooves 93 allow water leaks, which could otherwise penetrate the planetary gear, to be recovered.

FIG. 6 shows a drive assembly 100 formed of two drive units according to FIG. 4 and each including a transmission device 101, 102 with a continuously variable ratio as described hereinbefore, whose input shaft 11 is the shaft of a respective electric motor 103, 104. Output shafts 27 of the transmission devices are respectively coupled to a left driving wheel and a right driving wheel of a motor vehicle. For example, each planetary gear 3 can be housed inside the wheel which it drives. Those elements which are similar to those of FIG. 4 bear identical references. Moreover, a pair of hydraulic lines 105, 107 connect the two hydraulic circuits, between points 106, 108 located on either side of pump 60 in each circuit. Line 107 includes an adjustable flow limiting valve 109, operating in both directions of flow and activated by electronic control unit 67. It is then possible to achieve a differential effect by allowing a difference in speed between the wheels when the two motors 103 and 104 rotate at the same speed. This is particularly advantageous with the use of polyphase electric motors powered at a variable frequency by a common source, thus at the same frequency, in particular in a vehicle of the type described in European Patent No. 85 394. The working conditions of the two motors can thus be the same and can be optimised. When valve 109 is entirely open, the interconnection assured by lines 105 and 107 balances the respective pressure in the two pumps 60, thus equalising the reaction torques in the two planetary gears 3, whose output torque will also be equal if the torques of the two motors 103 and 104 are equal. Valve 109 allows the differential effect to be apportioned and even the differential to be blocked when the vehicle is in limited adherence conditions or one of the wheels is skidding for example. If required, a second valve similar to valve 109 can be installed on line 105.

Of course, the differential effect arrangement according to FIG. 6 may also be achieved with two hydraulic circuits according to FIG. 5, assuring the cooling of motors 103 and 105.

For an assembly according to FIG. 6 to operate as described, it is not indispensable for each pump 60 to be incorporated in the corresponding planetary gear 3. Generally, it is sufficient for the reaction element of the planetary gear to be mechanically coupled to the pump rotor to be supported by it.

The diagram of FIG. 7 shows, in a simplified manner, drive assembly 100 of FIG. 6 and also shows the two driving wheels 111 and 112 coupled to the respective output shafts 27 of transmission devices 101 and 102. In each of these devices, the reference 113 designates the assembly of the two pairs of hydraulic valves 63 and 65 shown in FIGS. 4 to 6. In order to simplify the drawing, the valve control means are not shown.

FIG. 8 shows a drive assembly 120 having the following modifications with respect to assembly 100 shown in FIG. 7. The two electric motors 103 and 104 are replaced by a single motor 123 which drives driving wheels 111 and 112 of a same driving-axle via two respective transmission devices 101 and 102, each of which includes planetary gear 3, pump 60 associated with this gear and the hydraulic circuit associated with the pump. Motor 123 may be, as desired, an electric motor, an internal combustion engine or any other driving machine. It drives, via a gear 124 and possibly a gear box 125, a driving-axle 126 coupled to input shaft 11 of each planetary gear 3.

The assembly of the two transmission devices 101 and 102 operates like a differential via a hydraulic link in the same way as the example of FIG. 7 and thus allows a mechanical differential to be omitted from driving-axle 126. This "hydraulic" differential has two main operating advantages over a mechanical gear differential. On the one hand, it can balance torques on the two driving wheels even when they are rotating at different speeds, whereas a mechanical differential applies a stronger torque on the wheel which is rotating more slowly and thus tends to cause skidding. On the other hand, it allows the differential effect to be blocked or limited by means of valve 109 in a much simpler, more flexible and less expensive way than in a mechanical differential.

The example of FIG. 9 is a drive assembly 130 using the same principles as the example of FIG. 8 to drive from a single motor 123 four wheels 111, 112, 121, 122 of two driving-axles of a vehicle owing to respective individual transmission devices 101, 102, 131 and 132 such as devices 101 and 102 described hereinbefore. Motor 123 drives, via elements 124 and 125 described hereinbefore, a longitudinal transmission shaft 134 driving at equal speeds the two driving-axles 126 and 136 via corner gears 137 and 138. The hydraulic elements associated with each axle are similar. On the connecting line 107 associated with each axle, two points 139 and 140 located on either side of valve 109 are connected by respective hydraulic lines 141 and 142 to the same points of connecting line 107 associated with the other axle. This hydraulic interconnection between the two axles fulfils the same functions as a central mechanical differential placed on shaft 134. Preferably, lines 141 and 142 pass through an adjustable valve unit 143 which, between the two axles, plays the same role as valve 109 between two wheels of an axle for blocking or limiting the differential effect. Unit 143 can also be activated manually or by means of a similar electronic control unit to unit 67 described hereinbefore.

What is claimed is:

1. A vehicle drive assembly including: motor means; at least a pair of continuously variable ratio transmission devices, which each drive a driving wheel or a driving axle of the vehicle; and means for regulating said transmission devices;

wherein each transmission device includes a planetary gear having an input shaft coupled to said motor means and an output shaft coupled to the corresponding driving wheel or driving axle, said planetary gear including three main elements, namely: a sun wheel; a planet wheel carrier provided with a plurality of planet wheels; and a ring gear having an inner toothing meshed with said planet wheels; one of said three main elements being connected to said input shaft, another being connected to said output shaft and the third acting as a reaction element;

wherein each transmission device further includes a positive displacement pump, driven by said reaction element of said planetary gear, and a hydraulic circuit passing through said pump and provided with at least an adjustable hydraulic valve;

wherein said regulating means are arranged to control said hydraulic valves to adjust the speed and/or the torque of said output shaft of each planetary gear;

and wherein two points located on either side of said pump in the hydraulic circuit of each transmission device are connected to the corresponding points of the other transmission device of said pair by connecting hydraulic lines.

2. A drive assembly according to claim 1, wherein at least one of said connecting hydraulic lines is fitted with an adjustable valve controlled by said regulating means.

3. A drive assembly according to claim 1, wherein said reaction element of each planetary gear is said ring gear.

4. A drive assembly according to claim 3, wherein said ring gear forms at least a part of a rotor of said pump.

5. A drive assembly according to claim 3, wherein said hydraulic valve is an adjustable flow-limiting valve.

6. A drive assembly according to claim 3, wherein said hydraulic valve is an adjustable pressure-limiting valve.

7. A drive assembly according to claim 1, wherein said regulating means includes an electronic control unit.

8. A drive assembly according to claim 7, wherein said electronic control unit receives signals from at least a sensor selected from among an input shaft speed sensor, an output shaft rotational speed sensor, an accelerator position sensor or a motor temperature sensor.

9. A drive assembly according to claim 1, wherein said motor means include electric motors, each transmission device being coupled to a respective electric motor to form a drive unit.

10. A drive assembly according to claim 9, wherein said hydraulic circuit of each transmission device includes a cooling circuit for said electric motor.

11. A drive assembly according to claim 1, wherein said motor means includes a common motor driving at least a pair of said transmission devices via a driving axle coupled to said input shafts of said planetary gears of said transmission devices.

12. A drive assembly according to claim 11, wherein said common motor drives two of said pairs of transmission devices, said driving axle of each of said pairs being coupled to a transmission shaft driven by said motor.

13. A continuously variable ratio transmission device including: a planetary gear provided with an input shaft coupled to motor means and an output shaft; a positive displacement pump incorporated in said planetary gear and associated with a hydraulic circuit provided with at least an adjustable hydraulic valve; and means for controlling said valve to adjust the speed and/or torque of said output shaft;

wherein said planetary gear is formed of a sun wheel, a planet wheel carrier provided with a plurality of planet wheels and a ring gear having an inner toothing meshed with said planet wheels, said input shaft being connected to said sun wheel and said output shaft being connected to said planet wheel carrier or vice versa, said pump including a casing and a rotor formed at least in part by said ring gear;

and wherein said ring gear with an inner toothing has a non-circular outer surface against which at least two segments which slide radially in said pump casing abut, said segments delimiting two symmetrical chambers between said rotor and said pump casing.

14. A transmission device according to claim 13, wherein said hydraulic valve is an adjustable flow-limiting valve.

15. A transmission device according to claim 13, wherein said hydraulic valve is an adjustable pressure-limiting valve.

16. A transmission device according to claim 13, wherein said hydraulic valve control means include an electronic control unit which receives signals from at least a sensor selected from among an input shaft rotational speed sensor, an output shaft rotational speed sensor, an accelerator position sensor or a motor means temperature sensor.

* * * * *